(12) United States Patent
Lauenstein et al.

(10) Patent No.: US 10,255,382 B1
(45) Date of Patent: Apr. 9, 2019

(54) METHOD FOR FORMING COMPONENT-LEVEL RADIATION SHIELD OPTIMIZED FOR ENVIRONMENTAL RADIATION CHARACTERISTICS AND DESIGN CRITERA

(71) Applicant: The United States of America as represented by the Administrator of NASA, Washington, DC (US)

(72) Inventors: Jean-Marie Lauenstein, Laurel, MD (US); Steven J. Kenyon, Hanover, MD (US); Raymond L. Ladbury, Mt. Airy, MD (US); Thomas Jordan, Gaithersburg, MD (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 15/685,556

(22) Filed: Aug. 24, 2017

(51) Int. Cl.
  *G06F 17/50* (2006.01)
  *H05K 9/00* (2006.01)
  *B29C 64/10* (2017.01)

(52) U.S. Cl.
  CPC .............. *G06F 17/50* (2013.01); *B29C 64/10* (2017.08); *H05K 9/0073* (2013.01)

(58) Field of Classification Search
  CPC ........ G06F 15/50; B29C 64/10; H05K 9/0073
  See application file for complete search history.

(56) References Cited

U.S. PATENT DOCUMENTS

| | | | |
|---|---|---|---|
| 2016/0204073 A1* | 7/2016 | Beak ..................... | H01L 23/295 455/418 |
| 2016/0289468 A1* | 10/2016 | Turner .................. | B29C 64/106 |
| 2017/0173892 A1* | 6/2017 | Steele ................. | B29C 35/0805 |
| 2017/0239723 A1* | 8/2017 | Hoyt ...................... | B33Y 80/00 |

* cited by examiner

*Primary Examiner* — Vincent H Tran
(74) *Attorney, Agent, or Firm* — Christopher O. Edwards; Bryan A. Geurts; Mark P. Dvorscak

(57) ABSTRACT

A method for forming an optimized radiation shield design for a component including providing a computer system programmed to generate data files that define a component radiation shield having an optimized design based on pre-stored data defining particular radiation characteristics and user-provided data defining radiation shield design criteria. Radiation shield design criteria are inputted into the computer system which processes the inputted radiation shield design criteria and the pre-stored data defining particular radiation characteristics in order to generate data files defining an optimized design for a component radiation shield. The generated data files defining the optimized design for a component radiation shield are provided to a metallic three-dimensional printing system. The three-dimensional printing system is then activated to form a component radiation shield using a predetermined metal powder and the generated data files that define the optimized component radiation shield design. The formed component radiation shield is then attached to the component or the circuit board.

13 Claims, 2 Drawing Sheets

METHOD FOR FORMING COMPONENT-LEVEL RADIATION SHIELD OPTIMIZED FOR ENVIRONMENTAL RADIATION CHARACTERISTICS AND DESIGN CRITERA

FIELD OF THE INVENTION

The present invention relates to a method for forming a component-level radiation shield.

BACKGROUND

Functional and parametric degradation of microcircuits due to total ionizing dose (TID) creates significant obstacles to the deployment of critical state of the-art technologies in space missions. Moreover, since device dielectrics in which such degradation occurs vary from one fabrication lot to the next, these effects must be re-evaluated on a lot-by-lot basis. Space mission designers are moving toward smaller, cheaper designs that reduce system-level shielding and consequently, limit the lifetimes of the space missions. Currently, mission radiation reliability requirements are achieved by shielding the electronics box and/or by the shielding on the satellite or spacecraft in conjunction with the use of radiation-hardened electronics. However, space missions are targeting more radiation-harsh environments thereby demanding improved shielding techniques. For example, vulnerable components typically require shielding over 4 pi-steradians. Often, the most effective mitigation against total ionizing dose (TID) degradation is the addition of radiation shielding to the electronics box. Unfortunately, shielding materials can add significant mass to a system. One conventional method for reducing additional mass to the system is to apply spot shielding in the form of cover plates only on the critical components that require shielding. This conventional method provides limited shielding because of the omnidirectional natural radiation environment in space. However, reducing radiation shielding for the electronics box and/or reducing spacecraft-level shielding will necessitate more complex spot shielding to protect the components from the omnidirectional radiation environment. Such complex spot shielding entails complex patterned designs that require labor-intensive machining of complex metal designs and time-consuming installation. Furthermore, the shielding effectiveness of such complex patterned designs must be verified with three-dimensional ray-trace analysis. Small package sizes make component-level shielding fabrication even more challenging.

What is needed is a method for forming a component-level radiation shield that eliminates the problems and disadvantages associated with the aforementioned conventional practices.

SUMMARY OF THE INVENTION

The present invention sets forth a unique and novel method for forming component-level radiation shields that are optimized for the particular component packaging, available space on the printed circuit board, the mission radiation environment and collateral shielding provided by the spacecraft, electronics box and/or other surrounding objects. In accordance with an exemplary embodiment of the invention, a computer system is programmed to generate three-dimensional data files that define a component-level radiation shield having an optimized design based on known and pre-stored data defining particular radiation characteristics and user-provided data defining radiation shield design criteria. The three-dimensional data files defining the design of the optimized radiation shield are then inputted into the processor or computer that controls a direct metal laser sintering three-dimensional (3D) printer system. The printer system forms the optimized component shield using a metal alloy powder and the data files that define the design of the optimized radiation shield. The optimized component shield is then attached to the component and/or the circuit board. Suitable adhesives are used to attach the optimized component shield to the component and/or circuit board. Thus, the method of the present invention provides a cost-efficient technique for producing a mass-efficient, optimized radiation shield that significantly reduces infusion risk of new electronics technologies by reducing total ionizing dose (TID) exposure. The method of the present invention allows for the use of state-of-the-art electronics on spacecraft thereby improving performance while simultaneously reducing hardware complexity, volume and power consumption. A significant advantage of the method of the present invention is that it allows for radiation shielding to be accomplished with only spot-shielding on critical components that require such shielding. Since spot-shielding is used, lightweight spacecraft structural materials may be used to fabricate the spacecraft thereby reducing the overall mass and weight of the spacecraft. Spot-shielding critical components that require such shielding extends the operational life of such components thereby increasing the radiation tolerance of the overall system and allowing the spacecraft or satellite to embark on relatively longer missions in severe radiation environments. The optimized component radiation shields produced by the method of the present invention achieve component-level 4 pi-steradian radiation shielding.

One exemplary embodiment of the invention sets forth a method for forming an optimized radiation shield for components comprising providing a computer system having a least one memory medium and at least one processing element programmed to generate data files that define a component radiation shield having an optimized design based on pre-stored data defining particular radiation characteristics and user-provided data defining radiation shield design criteria. Radiation shield design criteria are entered into the computer system. Then at least one processing element processes the inputted radiation shield design criteria and the pre-stored data defining particular radiation characteristics in order to generate data files defining an optimized design for a component radiation shield. The generated data files are provided to a direct metal laser sintering (DMLS) three-dimensional printing system which includes a build chamber, a build platform within the build chamber, a region for receiving metal powder that is to be used in the direct metal laser sintering process and a computer system that controls the operation of the printing system. The generated data files which define the optimized design for the component radiation shield are inputted into the computer system of the printing system. A predetermined metal powder is provided to the printing system. The printing system is then activated so as to form on the build platform a component radiation shield using the metal powder and the generated data files that define the optimized component radiation shield design. The formed component radiation shield is then attached to the component or to a circuit board such as a printed circuit board.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EXEMPLARY EMBODIMENTS

As used herein, the term "memory medium" includes any of various types of memory devices or storage devices, such an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers or other similar types of memory elements, etc.; and a non-transitory computer readable storage medium. The memory medium may include other types of memory as well or combinations thereof. In addition, the memory medium may be located in a first computer system in which the programs are executed, or may be located in a second different computer system which connects to the first computer system over a network, such as the Internet. In the latter scenario, the second computer system may provide program instructions to the first computer for execution. The term "memory medium" may include two or more memory mediums which may reside in different locations, e.g. in different computer systems that are connected over a network. The memory medium may store program instructions (e.g., embodied as computer programs) that may be executed by one or more processors.

As used herein, "Processing Element" refers to various elements or combinations of elements. Processing elements include, for example, circuits such as an ASIC (Application Specific Integrated Circuit), portions or circuits of individual processor cores, entire processor cores, individual processors, signal processors having analog-to-digital conversion circuitry, programmable hardware devices such as field programmable gate array (FPGA), and or larger portions of systems that include multiple processors.

As used herein, "Computer System" refers to any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices, or any device (or combination of devices) having at least one "processing element" that executes instructions from a memory medium.

As used herein, "Metallic Additive Manufacturing Processes" refers to any metal-based additive manufacturing process including Direct-Metal Laser Sintering (DMLS), Selective Laser Sintering (SLS), Selective Laser Melting (SLM), Powder Bed Fusion, Electron Beam Melting (EBM) and Wire-Feed Manufacturing.

As used herein, "Metallic 3D Printing System" or "Metallic Three-Dimensional Printing System" refers to any of the metallic 3D printing systems used in any of the "Metallic Additive Manufacturing Processes".

Figure 1:
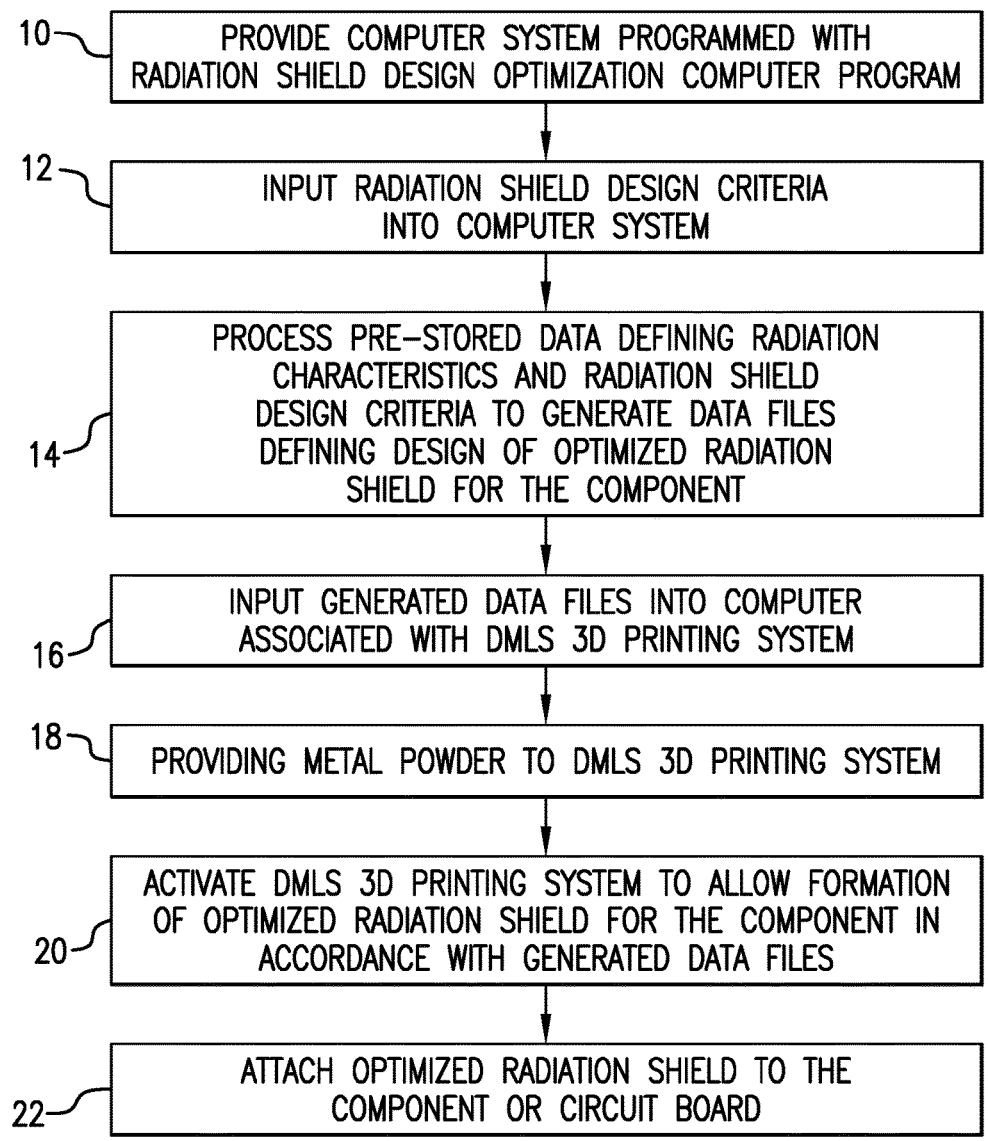
FIG. 1 is a flow chart of an exemplary embodiment of the method of the present invention.

FIG. 1 is a flowchart of a method for producing an optimized component-level radiation shield in accordance with an exemplary embodiment of the present invention. In step 10, a computer system having at least one processing element and at least one memory medium is programmed to execute an optimization software program that processes particular input data and then generates data files defining an optimum component radiation shield design. In an exemplary embodiment, the optimization software program includes algorithms that calculate radiation effects on complex CAD/CSG geometry models of space systems and uses data representing total dose, charged deposition, particle counting with coincidence/anti-coincidence logic, and single particle event effect/upsets (SEE/SEU). Specifically, the optimization software program addresses total dose, damage, upset, charging and single particle and other radiation effects from the planetary trapped radiation belts, solar particle events, galactic cosmic rays and on-board nuclear sources. Thus, the optimization software program uses known mathematical and scientific variables in processing shielding design criteria to generate the optimized component shield design. In an exemplary embodiment, the known mathematical and scientific variables are stored in the at least one memory medium of the computer system. The shielding design criteria are described in detail in the ensuing description. In an exemplary embodiment, the optimization software program is the commercially available Novice™ software program developed and marketed by EMPC of Gaithersburg, Md. However, it is to be understood that other suitable optimization software programs may be used as well in order to achieve the objects of the invention.

In step 12, the data defining the radiation shield design criteria is inputted or imported into the computer system. The radiation shield design criteria include shielding requirements and information about the electronic component that requires radiation shielding. As part of this step, a CAD file and/or other detailed geometry file of the electronic component packaging is imported into the computer system. An example of electronic component packaging is the CERDIP 8-lead component package 50 shown in FIG.

2A. In this example, electronic component package 50 is an operational amplifier. The imported radiation shield design criteria include data that define the available space on the printed circuit board (PCB) and the particular radiation environment to which the spacecraft will be exposed. The data defining the radiation environment includes data defining any on-board nuclear power sources. The imported radiation shield design criteria include data defining any collateral shielding (e.g. spacecraft, electronics boxes or other structures) that may affect or influence the level of radiation from a particular direction reaching the component that requires radiation shielding. The imported radiation shield design criteria further include data defining the properties of the material (e.g. metal powder) that will be used in the DMLS printing process.

In step 14, once all radiation shield design criteria are imported into the computer system, the optimization software program processes the known mathematical and scientific variables and the radiation shield design criteria in order to generate data representing an optimized component-level radiation shield design. In an exemplary embodiment, the data representing the optimized component-level radiation shield design is in the form of an STL CAD file which is a standard type file used in DMLS 3D printer systems. However, it is to be understood that the data representing the optimized component-level radiation shield design may be configured as another type of data file.

In step 16, the STL CAD file is directly imported into a processing element of a computer system that is associated with and controls the DMLS 3D printer system. The printer system further includes a build chamber, a build platform within the build chamber and a region for receiving metal powder that is to be used in the direct metal laser sintering process. DMLS 3D printing systems are well known in the art and therefore, are not discussed in detail herein. At step 18, the metal powder that will be used in the 3D printing process is provided to the DMLS 3D printer system. In an exemplary embodiment, the metal powder is Cobalt Chrome (CoCr). In another exemplary embodiment, the metal powder is Inconel Nickel-Chromium alloy 625. However, it is to be understood that the metal powder may be comprised of other suitable alloys.

Figure 2A:
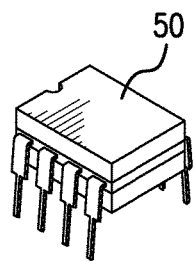
FIG. 2A is a perspective view of an electronic component for which an optimized radiation shield is formed in accordance with the method shown by the flow chart of FIG. 1.
Figure 2B:
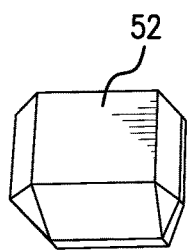
FIG. 2B is a perspective view of a component radiation shield made in accordance with the method shown by the flow chart of FIG. 1, the view showing the top and side surfaces of the component radiation shield.
Figure 2C:
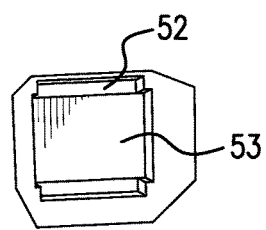
FIG. 2C is another view of the component radiation shield of FIG. 2B, the view showing the component radiation shield upside down so as to facilitate viewing of the interior thereof.
Figure 2D:
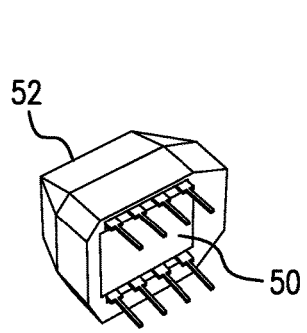
FIG. 2D is a perspective view showing the component radiation shield shown in FIG. 2B attached to the electronic component shown in FIG. 2A.

In step 20, the DMLS 3D printer system is activated and, in accordance with the STL CAD data files generated by the optimization software program, forms the optimized radiation shield on the build platform using the metal powder. The resulting optimized radiation shield 52 is shown in FIGS. 2B, 2C and 2D. FIG. 2B shows the resulting optimized radiation shield 52 right-side up. In FIG. 2C, optimized radiation shield 52 is shown upside down to facilitate viewing the interior 53 thereof, the detail of component lead clearance and the variable wall thicknesses that are determined for the specific location of the component in the electronics box, or on the printed circuit board or in the spacecraft. FIG. 2D illustrates optimized radiation shield 52 fitted onto CERDIP 8-lead component package 50.

Figure 2E:
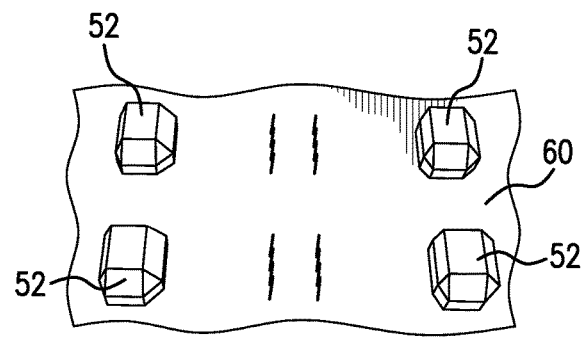
FIG. 2E is a perspective view showing a printed circuit board having attached thereto a plurality of component radiation shields made in accordance with the method of the present invention as illustrated by the flow chart of FIG. 1, each component radiation shield enveloping and attached to a corresponding electronic component that is attached to the printed circuit board.

In step 22, optimized radiation shield 52 is attached to the component and/or the printed circuit board (PCB). This is illustrated in FIG. 2E. Four CERDIP 8-lead component packages, similar to component package 50, are connected to circuit board 60 and each CERDIP 8-lead component package is capped with an optimized radiation shield 52. In an exemplary embodiment, adhesives are used to adhere the optimized radiation shield 52 to the component but not the printed circuit board. In another exemplary embodiment, the optimized radiation shield 52 is adhered to only the printed circuit board but not the component. In yet another exemplary embodiment, the optimized radiation shield 52 is adhered to both the component and the printed circuit board. In a preferred embodiment, the adhesives are suitable for use in an outer space environment. One suitable adhesive is known as Stycast 2850FT which has excellent thermal conductivity, a relatively low coefficient of thermal expansion which is similar to that of the printed circuit board, a high impact (shock) resistance, excellent low-temperature properties, low outgassing and high dielectric strength. Another suitable adhesive is the Pro-Set Epoxy 175 Adhesive with ADV-275 Medium Cure Speed Hardener. The adhesive has excellent composite bonding adhesion and high tensile strength. This adhesive also has excellent lap-shear adhesion to metallic surfaces. Other suitable adhesives may be used as well.

Although the foregoing description is in terms of using a DMLS-type 3D printer, it is to be understood that any of the metallic three-dimensional printing systems used in the well-known Metallic Additive Manufacturing Processes may be used in the implementation of the method of the present invention.

The present invention provides many advantages and benefits. For example, the optimized radiation shield made in accordance with the invention enables the use of electronic components that would otherwise fail to meet mission total-ionizing dose requirements and avoids adding additional mass to the electronics box or reducing the mass of the electronics boxes. The additional component shielding in long-duration missions is critical for increasing mission lifetimes especially for spacecraft flying in harsh radiation environment missions such as the radiation belts of Earth and Jupiter, wherein the mass savings from component-level shielding as opposed to box-level shielding is particularly substantial. The optimized component radiation shield made in accordance with the invention also increases the mission lifetime of small satellites which typically have only minimal collateral shielding.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications so as to thereby enable others skilled in the art to best utilize the invention and various embodiments with various modifications as are suited to the particular use contemplated.

What is claimed is:

1. A method for forming an optimized radiation shield for components, comprising:

providing a computer system having a least one memory medium and at least one processing element programmed to generate data files that define a component radiation shield having an optimized design based on pre-stored data defining particular radiation characteristics and user-provided data defining radiation shield design criteria;

inputting the radiation shield design criteria into the computer system;

processing, with the at least one processing element, the inputted radiation shield design criteria and the pre-stored data defining particular radiation characteristics in order to generate data files defining an optimized design for a component radiation shield;

providing a metallic three-dimensional printing system having a build chamber, a build platform within the build chamber, an area for receiving metal powder and a computer system for controlling the operation of the metallic three-dimensional printing system;

inputting the generated data files defining an optimized design for the component radiation shield into the computer system of the metallic three-dimensional printing system;

providing a metal powder to the metallic three-dimensional printing system;

activating the metallic three-dimensional printing system so that the metallic three-dimensional printing system forms a component radiation shield on the build platform using the metal powder and the generated data files that define the optimized component radiation shield design; and attaching the formed component radiation shield to a component or a circuit board.

2. The method according to claim 1 wherein the pre-stored radiation characteristics include data relating to the radiation characteristics of the planetary trapped radiation belts, solar particle events, galactic cosmic rays and nuclear power sources.

3. The method according to claim 1 wherein the user-provided radiation shield design criteria includes data files that define the geometry of the packaging of the component that requires radiation shielding.

4. The method according to claim 3 wherein the data files that define the geometry of the packaging of the component that requires radiation shielding comprises CAD files.

5. The method according to claim 1 wherein the user-provided radiation shield design criteria includes data defining available space for the radiation shield on a circuit board.

6. The method according to claim 1 wherein the user-provided radiation shield design criteria includes data defining collateral shielding that may affect the level of radiation from a particular direction that reaches the component which requires radiation shielding.

7. The method according to claim 1 wherein the user-provided radiation shield design criteria includes data defining the properties of the metal powder.

8. The method according to claim 1 wherein the metal powder comprises CoCr.

9. The method according to claim 1 wherein the metal powder comprises an Inconel alloy.

10. The method according to claim 9 wherein the Inconel alloy is an Inconel Nickel-Chromium Alloy.

11. The method according to claim 1 wherein the step of attaching the formed optimized component radiation shield to a component comprises the step of adhering the formed component radiation shield to the component with an adhesive.

12. The method according to claim 1 wherein the step of attaching the formed optimized component radiation shield to a circuit board comprises the step of adhering the formed component radiation shield to the circuit board with an adhesive.

13. The method according to claim 1 wherein the metallic three-dimensional printing system is a direct-metal laser sintering three-dimensional printing system.

* * * * *